United States Patent [19]

Ando

[11] Patent Number: 4,982,356

[45] Date of Patent: Jan. 1, 1991

[54] MULTIPLE-VALUED CURRENT MODE ADDER IMPLEMENTED BY TRANSISTOR HAVING NEGATIVE TRANSCONDUCTANCE

[75] Inventor: Yuji Ando, Tokyo, Japan

[73] Assignee: NEC Corporation, Japan

[21] Appl. No.: 313,485

[22] Filed: Feb. 22, 1989

[30] Foreign Application Priority Data

Feb. 22, 1988 [JP] Japan ................... 63-39858

[51] Int. Cl.[5] .................................. G06F 7/50
[52] U.S. Cl. .................................... 364/773
[58] Field of Search ............... 364/746.2, 768, 773

[56] References Cited

U.S. PATENT DOCUMENTS

| | | | |
|---|---|---|---|
| 3,156,816 | 11/1964 | Kosonocky et al. | 364/773 |
| 3,207,913 | 9/1965 | Herzog | 364/773 |
| 3,260,841 | 7/1966 | Hayden | 364/773 |
| 3,275,813 | 9/1966 | Brasstins | 364/773 |
| 3,277,289 | 10/1966 | Buelow et al. | 364/773 |
| 3,280,316 | 10/1966 | Jeeves | 364/773 |
| 3,420,992 | 1/1969 | Nissim et al. | 364/773 |
| 4,140,920 | 2/1979 | Dao et al. | 364/773 |

OTHER PUBLICATIONS

Amodei, J. J., "High-Speed Adders and Comparators Using Transistors and Tunnel Diodes", *IEEE Trans. on Electronic Computers*, Oct. 1964, pp. 563-575.

Current et al., "Four-Valued Threshold Logic Full Adder Circuit Implementations", *Current*, 1978, Ismu1-Ismu6.

Capasso et al., "Negative Transconductance Resonant Tunneling Field-Effect Transistors", Appl. Phys. Lett., vol. 51, No. 7, Aug. 17, 1987.

Bonnefoi et al., "Resonant Tunneling Transistors with Controllable Negative Differential Resistances", IEEE Electron Device Letters, vol. EDL-6, No. 12, Dec. 1985.

Kawahito et al., "A 32×32 Bit Multiplier Using Multiple-Valued MOS Current-Mode Circuits", VII-6.

Capasso et al., "Quantum-Well Resonant Tunneling Bipolar Transistor Operating at Room Temperature", IEEE Electron Device Letters, vol. EDL-7, No. 10, Oct. 1986.

Yokoyama et al., "A New Functional, Resonant-Tunneling Hot Electron Transistor (RHET)", Japanese Journal of Applied Physics, vol. 24, No. 11, Nov. 1985, pp. L853-L854.

*Primary Examiner*—Dale M. Shaw
*Attorney, Agent, or Firm*—Leydig, Voit & Mayer

[57] ABSTRACT

A multiple-valued current-mode adder has a current-to-voltage converter for converting a total current into an input voltage level, the total current comprising current values respectively representative of the values of input integers a transistor with a negative transconductance due to a resonant tunneling phenomenon and a threshold value detecting circuit with an output current which changes from a first level to a second level. The transistor and the threshold value detecting circuit have respective input nodes supplied with the input voltage level for respectively producing output currents respectively representative of a sum and a carry in accordance with the input voltage level.

17 Claims, 3 Drawing Sheets

MULTIPLE-VALUED CURRENT MODE ADDER IMPLEMENTED BY TRANSISTOR HAVING NEGATIVE TRANSCONDUCTANCE

FIELD OF THE INVENTION

This invention relates to an adder and, more particularly, to a multiple-valued current mode full adder incorporated in, for example, an ultra high speed computer system.

BACKGROUND OF THE INVENTION

Various digital full adders have been proposed and implemented in arithmetic and logic circuits fabricated on semiconductor chips. However, larger integration and the improvement in processing speed is difficult to achieve when using the digital full adders due to technical problems associated with miniaturization of their component elements. For example, a signal propagation delay may be caused by a large parasitic capacitance coupled to each conductive wiring layer and a large area occupied by the wiring layers.

A multiple-valued arithmetic circuit implemented as an integrated circuit is proposed for not only providing a technical breakthrough but also avoiding the complex wiring arrangement. Each interconnecting wiring layer incorporated in the integrated circuit is available as a multiple-valued signal propagation path for the multiple-valued arithmetic circuit, and, for this reason, a relatively small area is occupied by the wiring layers. This results in enhancement in integration density. For example, Kawahito et al reported in Symposium on VLSI Technology held in 1987 that a 32×32 bit multiplier was implemented for processing radix-4 signed-digit numbers by using multiple-valued MOS current-mode circuits, the occupation area of which is a half of that of a known digital multiplier but the performance of which is equivalent to the known digital multiplier. This is because of the fact that each radix-4 full adder is capable of simultaneously processing two bits of each input data signal. Each full adder of the multiple-valued current-mode type is composed by 26 transistors, and each known digital full adder is formed by 9 NAND gates each consisting of three transistors. Then, the full adder of the multiple-valued current-mode type is not drastically decreased in the number of the component transistors. However, the full adder of the multiple-valued current-mode type is twice as large in the number of the simultaneously processed bits as the digital full adder. This is conducive to the enhancement of the integration density without increasing the occupation area.

In general, assuming now that two integers each ranging between zero and m−1 are supplied to a radix-m full adder where m is an integer not less than two and that a carry bit c' supplied from a lower bit is either one or zero, the sum s and the carry bit c are represented by the following equation $$m \cdot c + s = x + y + c' \quad \text{(Eq. 1)}$$

where the sum s is an integer not less than zero and not greater than m−1 and the carry bit c is either zero or one.

In case of the binary operation or the m is equal to two, the sum s is achieved by exclusive OR operation. However, if the m is a multiple-valued integer, it is difficult to obtain the sum s by a simple logic operation. For this reason, the prior art full adder sequence is decreased in stage by increasing the value of the m, but each full adder is increased in circuit complexity. This trade-off causes a restriction on the improvement in operation speed and on the enhancement of the integration density, and, for this reason, a new approach is desired to improve the operation speed as well as the integration density.

SUMMARY OF THE INVENTION

It is therefore an important object of the present invention to provide a multiple-valued current-mode full adder which is improved in the operation speed as well as the integration density.

It is also an important object of the present invention to provide a multiple-valued current-mode full adder which is simplified in circuit arrangement.

To accomplish these objects, the present invention proposes to form the multiple-valued current-mode full adder by using transistors with a negative transconductance due to a resonance tunneling effect.

In accordance with the present invention, there is provided a multiple-valued current-mode adder for adding a plurality of integers each not less than zero, comprising: (a) a summing node where a plurality of currents are merged, the amounts of the currents being representative of values of the integers, respectively; (b) an input current-to-voltage converter coupled to the summing node and operative to convert the total amount of the currents into an input voltage level, the input voltage level being within a predetermined range (c) a transistor having a negative transconductance with a turning point the voltage level of which is within the predetermined range, the transistor being supplied with the input voltage level and producing a first output current in accordance with the input voltage level and negative transfer conductance; and (d) a threshold value detecting circuit supplied with the input voltage level and producing a second output current in accordance with the input voltage level, the second output current being varying at a certain point from a first value to a second value and the voltage level of the certain point being within the predetermined range.

BRIEF DESCRIPTION OF THE DRAWINGS

The features and advantages of a multiple-valued current-mode full adder according to the present invention will be more clearly understood from the following description taken in conjunction with the accompanying drawings in which.

DESCRIPTION OF THE PREFERRED EMBODIMENTS

First embodiment

Figure 1:
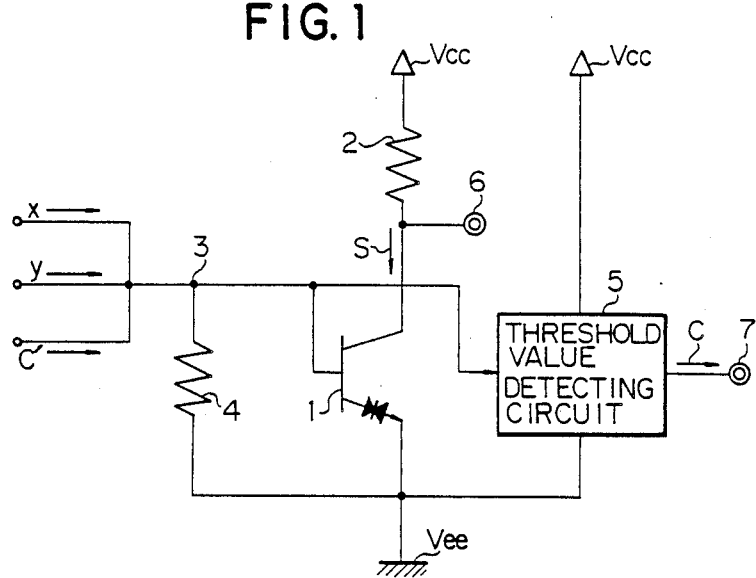
FIG. 1 is a diagram showing the circuit arrangement of a multiple-valued current-mode full adder embodying the present invention.

Referring to FIG. 1 of the drawings, there is shown the circuit arrangement of a multiple-valued current-mode full adder embodying the present invention. The multiple-valued current-mode full adder is of an m-ary type and supplied with two integers x and y each ranging between zero and m−1. With the two integers x and y, the multiple-valued current-mode full adder produces a sum s and a carry c with a value either zero or one, and the sum falls within a range between zero and m−1. The multiple-valued current-mode full adder is characterized by a resonant tunneling hot electron transistor 1 (which is sometimes abbreviated as "RHET"), and the resonant tunneling hot electron transistor 1 has a negative transfer conductance due to a resonance tunneling effect. The resonant tunneling hot electron transistor 1 is by way of example formed by the resonance-tunneling hot-electron transistor proposed by Yokoyama et al in Japanese Journal of Applied Physics, 1985 vol. 24, No. 11, page L853.

The resonant tunneling hot electron transistor 1 is coupled between a ground node Vee and a first resistor 2 which in turn is coupled to a voltage source Vcc. The resonant tunneling hot electron transistor 1 is coupled at the base node thereof to a summing node 3 where three currents cx, cy and cc′ are merged, and a second resistor 4 is coupled between the summing node 3 and the ground node Vee. Since the second resistor 4 is provided between the base node and the emitter node of the resonant tunneling hot electron transistor 1, a difference in voltage level between the ground level and the voltage level at the summing node 3 is applied to the resonant tunneling hot electron transistor 1 as the base-emitter voltage. The difference in voltage level is further supplied to the threshold-value detecting circuit 5. The amounts of the currents cx and cy respectively represent the values of the integers x and y, and the amount of the current cc′ is indicative of the carry c′ supplied from the lower order position.

The multiple-valued current-mode full adder further comprises a threshold value detecting circuit 5 coupled between the voltage source Vcc and the ground node Vee. The summing node 3 is further coupled to the input node of the threshold-value detecting circuit, so that the threshold-value detecting circuit 5 is operative to decide whether or not the amount of the total currents at the summing node 3 is indicative of a production of the carry c. A sum node 6 for a current is provided between the collector node of the resonant tunneling hot electron transistor 1 and the resistor 2, and the carry c appears at a carry node 7 of the threshold-value detecting circuit 5. The value of the sum is represented by the amount of current cs flowing into the resonant tunneling hot electron transistor 1, and the amount of current cc flowing into the carry node 7 is also indicative of the value of the carry c.

Description is hereinunder described for the circuit behavior of the multiple-valued current-mode full adder on the assumption that the m is selected to be four. In the 4-ary, each of the amounts of the currents cx and cy is represented by one of values of 0, i, 2i and 3i, and the amount of the current cc′ is either zero or one. When the currents cx, cy and cc′ are merged into the total current at the summing node 3, the amount of the total current has one of eight values, and the amount of the total current is converted into the difference in voltage level which is stepwise varied from zero level to seventh level 7v. Therefore, the base-emitter voltage has one of the eight values.

Figure 2:
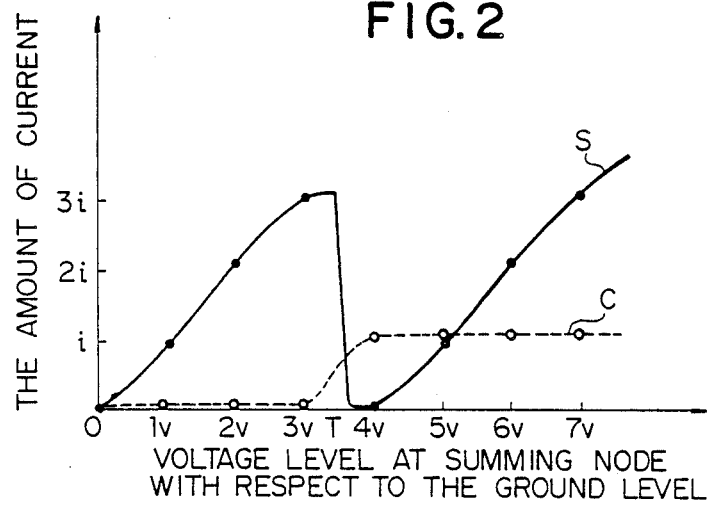
FIG. 2. is a graph showing the output current characteristics in terms of the input voltage level achieved by a resonant tunneling hot electron transistor and a threshold-value detecting circuit incorporated in the multiple-valued current-mode full adder illustrated in FIG. 1.

The resonant tunneling hot electron transistor 1 has output current characteristics in terms of the base-emitter voltage level as shown by plots S in FIG. 2. As will be seen from plots S, it is understood that the resonant tunneling hot electron transistor 1 has a negative transconductance rapidly inverted at a turning point T between the third value and the fourth value. The resonant tunneling hot electron transistor 1 with the negative transconductance causes the current s to flow thereinto, and the amount of the current cs is stepwise varied through 0, 1i, 2i and 3i as the base emitter voltage is stepwise varied through the zero level, first level 1v, second level 2v and third level 3v. However, when the base emitter voltage exceeds the turning point T, the amount of the current cs returns to zero. Then, the amount of the current cs increases from 0 through i and 2i to 3i as the base emitter voltage varies from the fourth level 4v, through fifth and sixth levels 5v and 6v to the seventh level 7v. In other words, the amount of the current cs is indicative of the remainder left on a division of the total current at the summing node 3 by four.

Plots C represent the output current characteristics of the threshold-detecting circuit 5 in terms of the difference in voltage level which is equal to the base emitter voltage. As shown by plots C, the output current of the threshold-value detecting circuit 5 is rapidly changed from zero to i when the difference in voltage level exceeds the third value 3v. For this reason, no current flows into the carry node 7 in so far as the difference in voltage level is not greater than the third level 3v. However, the amount of current cc takes place at a difference in voltage level not less than four. The following table 1 shows the relationship between the input integers x, y and c′ and the sum s and the carry c. (blank)

TABLE 1

| c′ | x | y | Summing node | s | c | c′ | x | y | Summing node | s | c |
|---|---|---|---|---|---|---|---|---|---|---|---|
| 0 | 0 | 0 | 0 | 0 | 0 | 1 | 0 | 0 | 1 | 1 | 0 |
| 0 | 0 | 1 | 1 | 1 | 0 | 1 | 0 | 1 | 2 | 2 | 0 |
| 0 | 0 | 2 | 2 | 2 | 0 | 1 | 0 | 2 | 3 | 3 | 0 |
| 0 | 0 | 3 | 3 | 3 | 0 | 1 | 0 | 3 | 4 | 0 | 1 |
| 0 | 1 | 0 | 1 | 1 | 0 | 1 | 1 | 0 | 2 | 2 | 0 |
| 0 | 1 | 1 | 2 | 2 | 0 | 1 | 1 | 1 | 3 | 3 | 0 |
| 0 | 1 | 2 | 3 | 3 | 0 | 1 | 1 | 2 | 4 | 0 | 1 |
| 0 | 1 | 3 | 4 | 0 | 1 | 1 | 1 | 3 | 5 | 1 | 1 |
| 0 | 2 | 0 | 2 | 2 | 0 | 1 | 2 | 0 | 3 | 3 | 0 |
| 0 | 2 | 1 | 3 | 3 | 0 | 1 | 2 | 1 | 4 | 0 | 1 |
| 0 | 2 | 2 | 4 | 0 | 1 | 1 | 2 | 2 | 5 | 1 | 1 |
| 0 | 2 | 3 | 5 | 1 | 1 | 1 | 2 | 3 | 6 | 2 | 1 |
| 0 | 3 | 0 | 3 | 3 | 0 | 1 | 3 | 0 | 4 | 0 | 1 |
| 0 | 3 | 1 | 4 | 0 | 1 | 1 | 3 | 1 | 5 | 1 | 1 |
| 0 | 3 | 2 | 5 | 1 | 1 | 1 | 3 | 2 | 6 | 2 | 1 |
| 0 | 3 | 3 | 6 | 2 | 1 | 1 | 3 | 3 | 7 | 3 | 1 |

Comparing the table with Equation 1, it is understood that the contents of the table exactly satisfy Equation 1.

In the multiple-valued current-mode full adder, since the sum node 6 is provided between the first resistor 2 and the collector node of the resonant tunneling hot electron transistor 1, an intermediate voltage between the first resistor 2 and the resonant tunneling hot electron transistor 1 is read out from the sum node 6 as the negative of the sum S. The amount of the current cc is supplied to the higher order position and, for this reason, adjusted to be equal to that of the current cc' supplied to the higher order full adder.

The multiple-valued current-mode full adder is of the 4-ary implementation, however, the present invention is applicable to any-ary arithmetic circuit.

The multiple-valued current-mode full adder according to the present invention is advantageous over the prior-art multiple-valued current-mode circuit in simplicity in circuit arrangement by virtue of the transistor with the negative transconductance. This simple circuit arrangement is conducive to the improvement in the operation speed.

Second embodiment

Figure 3:
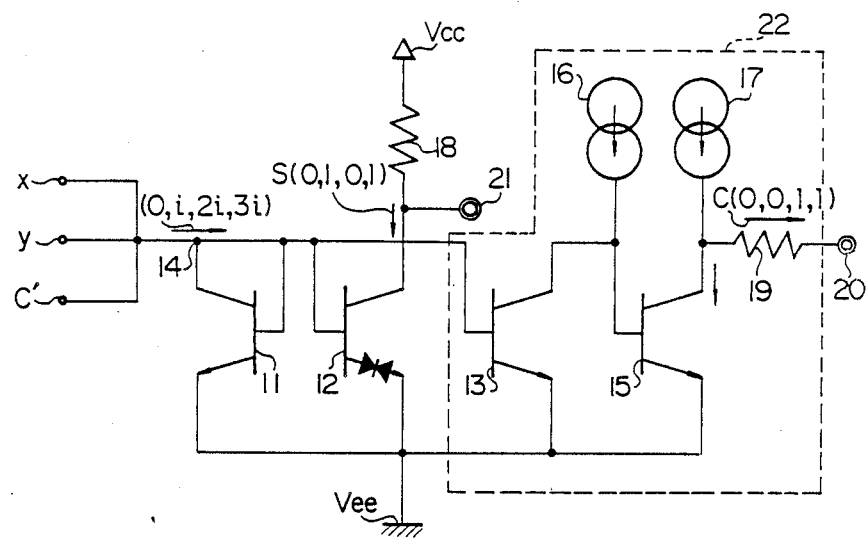
FIG. 3 is a diagram showing the circuit arrangement of a multiple-valued current-mode full adder embodying the present invention.

Turning to FIG. 3 of the drawings, there is shown the circuit arrangement of another multiple-valued current-mode full adder embodying the present invention. The multiple-valued current-mode full adder shown in FIG. 3 comprises three n-p-n type hetero-bipolar transistors 11, 12 and 13 coupled at the base nodes thereof to a summing node 14 and at the emitter nodes thereof to a ground node Vee, an n-p-n type hetero bipolar transistor 15 coupled at the base and collector nodes thereof to sources of current 16 and 17, respectively, a resistor 18 coupled between a voltage source Vcc and the collector node of the hetero bipolar transistor 12, and a resistor 19 coupled between the source of current 17 and a carry node 20. A sum node 21 is provided between the resistor 18 and the hetero bipolar transistor 12. The collector node of the hetero bipolar transistor 11 is coupled to the summing node 14, so that the amount of the total current at the summing node 14 is converted into a difference in voltage level and the base emitter voltage of the bipolar transistor 12 is tantamount to the difference in voltage level between the base and emitter nodes of the bipolar transistor 11. The hetero bipolar transistor 13 is coupled at the collector node thereof to the source of current 16, and the hetero bipolar transistors 13 and 15 form in combination a threshold-value detecting circuit 22 together with the sources of current 16 and 17 and the resistor 19.

The hetero bipolar transistor 12 is by way of example formed by a resonant tunneling bipolar transistor disclosed by Capasso et al in IEEE Electron Device Letters, 1986 Vol. EDL-7, No. 10, page 573, and the resonant tunneling bipolar transistor has a resonant tunneling barrier between the base and emitter thereof and, accordingly, achieves a negative transconductance.

Description is made for the operation of the multiple-valued current-mode full adder shown in FIG. 3 on the assumption that the full adder processes binary numbers. When three currents cx, cy and cc' representative of the two integers x and y and the carry c' are merged at the summing node 14 into a total current, and the amount of the total current is stepwise varied from zero through i and 2i to 3i. The amount of the total current is converted into the difference in voltage level by virtue cf the bipolar transistor 11 coupled in the diode fashion, and the difference in voltage level is applied in parallel to the hetero bipolar transistors 12 and 13. The hetero bipolar transistor 12 is similar in circuit behavior to the resonant tunneling transistor 1 forming part of the multiple-valued current-mode full adder illustrated in FIG. 1.

In detail, the amount of a current s into the bipolar transistor 12 is assumed to vary from zero to two, and, accordingly, the hetero bipolar transistor 12 is arranged to have the negative transconductance rapidly changed at a turning point of about 1.5. If the total current is stepwise increased in value from zero through one and two to three, the amount of the current s is varied as zero, one, zero and one depending upon the total current due to the negative transconductance. The amount of current is indicative of a remainder on a division of the amount of the total current by two, and the remainder is read out as an intermediate voltage level between the resistor 18 and the bipolar transistor 12. The intermediate voltage level is representative of the negative of the sum.

In the threshold value detecting circuit 22, the source of current 16 is arranged to produce a current of "1.5", and the current is supplied from the source of current 16 to the hetero bipolar transistor 13. On the other hand, the source of current 17 is arranged to produce a current of "1", and the hetero bipolar transistor 15 is supplied with the current from the source of current 17. In this situation, if a difference in voltage level not less than two is applied between the base and emitter nodes of the bipolar transistor 13, the "1.5" current flows into the collector node of the bipolar transistor 13. This results in the off state of the bipolar transistor 15. When the bipolar transistor 15 turns off, no current flows into the bipolar transistor 15 and, accordingly, the current flowing into the carry node 20 is increased in value to one. However, when a difference in voltage level not greater than one is applied between the base node and the emitter node of the bipolar transistor 13, the current flowing thereinto is decreased in value, and, accordingly, the bipolar transistor 15 turns on to allow the current to flow thereinto. This results in that the current flowing into the carry node 20 is decreased in value to zero. In this way, when the voltage level applied to the bipolar transistor 13 is changed from "0" to "3", the carry c is represented by the amount of the current cc stepwise varied as zero, zero, one and one depending upon the difference in voltage level. Table 2 summerizes the above described relationship, and the relationship is indicated in FIG. 3 in such a manner that the variables are placed in respective parentheses.

TABLE 2

| Total input current | Sum | Carry |
| --- | --- | --- |
| 0 | 0 | 0 |
| i | 1 | 0 |
| 2i | 0 | 1 |
| 3i | 1 | 1 |

Third embodiment

Figure 4:
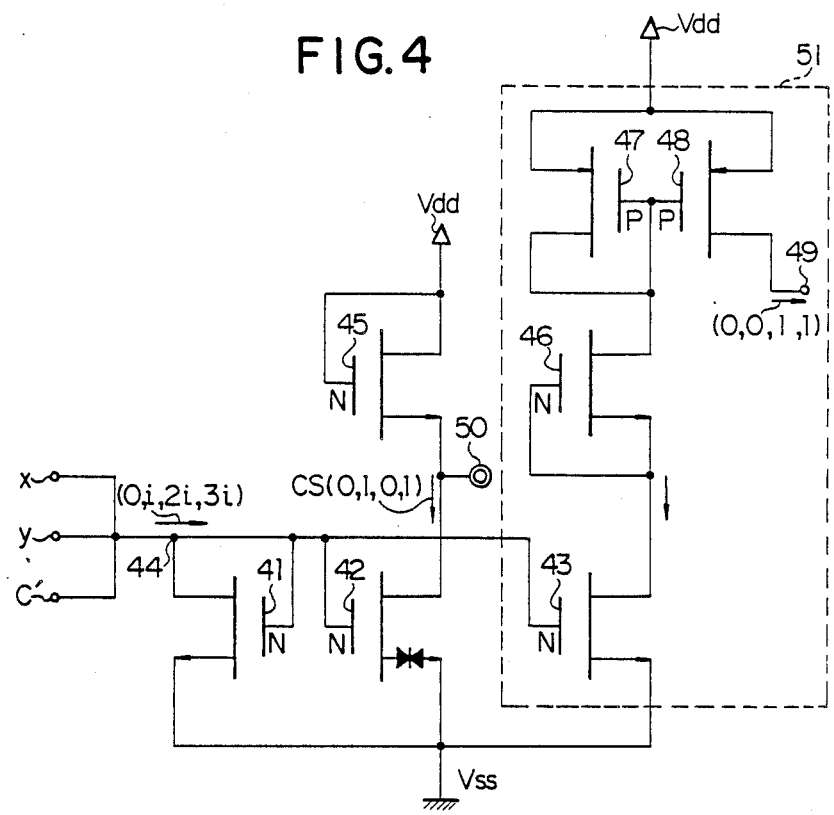
FIG. 4 is a diagram showing the circuit arrangement of still another multiple-valued current-mode full adder embodying the present invention.

Turning to FIG. 4 of the drawings, there is shown the arrangement of still another multiple-valued current-mode full adder embodying the present invention. The multiple-valued current-mode full adder shown in FIG. 4 comprises three n-channel enhancement-mode MES field effect transistors 41, 42 and 43 coupled at the gate nodes thereof to a summing node 44 and at the source nodes thereof to a ground node Vss, an n-channel enhancement-mode MES field effect transistor 45 coupled between the MES field effect transistor 42 and a voltage source Vdd in a diode coupling fashion, a series combination of an n-channel depletion-mode MES field effect transistor 46 and a p-channel enhancement-mode field effect transistor 47 coupled between the voltage source Vdd and the MES field effect transistor 43, and a p-channel enhancement-mode field effect transistor 48 coupled between the voltage source Vdd and a carry node 49. A sum node 50 is provided between the MES field effect transistors 45 and 42. The gate node of the MES field effect transistor 41 is coupled to the summing node 44, so that the amount of the total current at the summing node 44 is converted into a difference in voltage level and the gate source voltage of the MES field effect transistor 42 is tantamount to the difference in voltage level between the gate electrode and the source node of the MES field effect transistor 41.

The MES field effect transistor 43 forms in combination a threshold-value detecting circuit 51 together with the field effect transistors 46, 47 and 48.

The MES field effect transistor 42 is by way of example formed by a resonant tunneling metal-semiconductor (MES) field effect transistor disclosed by Bonnefoi et al in IEEE Electron Device Letters, 1985 Vol. EDL-6, No. 12, page 636, and the resonant tunneling MES field effect transistor achieves a negative transconductance. Another example of the resonant tunneling field effect transistor is disclosed by Capasso in Applied Physics Letters, 1987 Vol. 51, No. 7, page 526, and the resonant tunneling field effect transistor has a resonant tunneling barrier and, accordingly, achieves a negative transconductance.

The field effect transistor 45 has a gate electrode coupled to the source node thereof and, for this reason, serves as a load resistor equivalent to the resistor 18 of FIG. 3.

Description is made for the operation of the multiple-valued current-mode full adder shown in FIG. 4 on the assumption that the full adder processes binary numbers. When three currents cx, cy and cc′ representative of the two integers x and y and the carry c′ are merged at the summing node 44 into the total current, and the amount of the total current is stepwise varied from zero through i and 2i to 3i. The amount of the total current is converted into the difference in voltage level by virtue of the MES field effect transistor 41 coupled in the diode fashion, and the difference in voltage level is applied in parallel to the MES field effect transistors 42 and 43. The MES field effect transistor 42 is similar in circuit behavior to the resonant tunneling transistor 1 forming part of the multiple-valued current-mode full adder illustrated in FIG. 1.

In detail, it is assumed that the amount of a current flowing into the MES field effect transistor 42 is varied from zero to two and that the MES field effect transistor 42 is arranged to have the negative transconductance rapidly changed at a turning point of about 1.5. If the total current is stepwise increased in value from zero through one and two to three, the amount of the current cs is varied as zero, one, zero and one depending upon the total current due to the negative transconductance. The amount of current cs is indicative of a remainder on a division of the amount of the total current by two, and the remainder is read out as an intermediate voltage level between the field effect transistor 45 and the MES field effect transistor 42. The intermediate voltage level is representative of the negative of the sum.

In the threshold value detecting circuit 51, the field effect transistor 43 is arranged to have a threshold voltage value of "1.5". If a voltage level not less than two is applied to the gate electrode of the field effect transistor 43, the field effect transistor 43 turns on to pull down the voltage level at the gate electrodes of the p-channel enhancement-mode field effect transistors 47 and 48. The n-channel depletion-mode field effect transistor 46 defines the amount of a current flowing therethrough, and the p-channel type field effect transistor 48 allows a current to flow into a carry node 49. The amount of the current flowing into the carry node 49 is selected to be one. On the other hand, when the voltage level at the gate electrode of the field effect transistor 43 is not greater than one, the field effect transistor 43 remains in the off-state, thereby allowing both of the p-channel type field effect transistors 47 and 48 to turn off. Therefore, no current flows into the carry node 49. Table 3 summarizes the above described relationship, and the relationship is indicated in FIG. 3 in such a manner that the variables are placed in respective parentheses.

TABLE 3

| Total input current | Sum | Carry |
| --- | --- | --- |
| 0 | 0 | 0 |
| i | 1 | 0 |
| 2i | 0 | 1 |
| 3i | 1 | 1 |

Although particular embodiments of the present invention have been shown and described, it will be obvious to those skilled in the art that various changes and modifications may be made without departing from the spirit and scope of the present invention. For example, the multiple-valued current-mode full adder according to the present invention is implemented by transistors of another type such as, for example, high-electron mobility transistors (HEMT), permeable base transistors (PBT) or hetero junction metal-insulator-semiconductor (MIS) field effect transistors.

Figure 5:
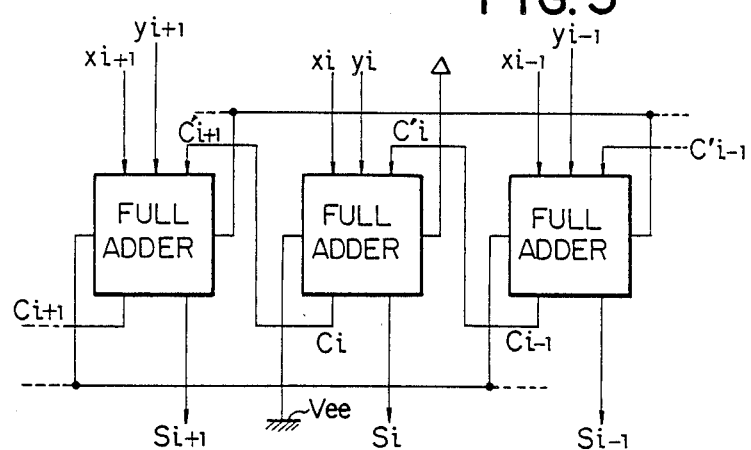
FIG. 5 is a block diagram showing the circuit arrangement of an n-digit adder formed by the multiple-valued current-mode full adders of the present invention.

The multiple-valued current-mode full adders are arranged to form an n-digit adder as shown in FIG. 5. It is necessary for the n-digit adder to prepare n−1 full adders of the multiple-valued current-mode type and a half adder without any carry node. The lowest order position of the sum is produced by the half adder, and the carry produced by each position is transferred to the subsequent order position.

What is claimed is:

1. A multiple-valued current-mode adder for adding a plurality of integers, comprising:
   (a) a summing node where a plurality of currents are merged, the amounts of said currents being representative of values of said integers, respectively;
   (b) an input current-to-voltage converter coupled to said summing node and operative to convert the total amount of said currents into an input voltage level, said input voltage level being within a predetermined range;
   (c) a transistor having a negative transconductance with a turning point the voltage level of which is within said predetermined range, said transistor being supplied with said input voltage level and producing a first output current in accordance with said input voltage level and said negative transconductance; and
   (d) a threshold value detecting circuit supplied with said input voltage level and producing a second output current in accordance with said input voltage level, said second output current varying at a certain point from a first value to a second value and the voltage level of said certain point being within said predetermined range.

2. A multiple-valued current-mode adder as set forth in claim 1, in which said transistor produces said negative transconductance on the basis of a resonant tunneling phenomenon.

3. A multiple-valued current-mode adder as set forth in claim 2, in which said transistor comprises a resonant tunneling hot electron transistor with a resonant tunneling barrier.

4. A multiple-valued current-mode adder as set forth in claim 3, in which said multiple-valued current-mode adder further comprises an output current-to-voltage converter coupled between a first voltage source and said transistor for converting said first output current into a first output voltage.

5. A multiple-valued current-mode adder as set forth in claim 4, in which said input current-to-voltage converter is formed by a load resistor coupled between said summing node and a second voltage source and in which said transistor is coupled between said output current-to-voltage converter and said second voltage source.

6. A multiple-valued current-mode adder as set forth in claim 5, in which said output current-to-voltage converter is formed by a load resistor.

7. A multiple-valued current-mode adder as set forth in claim 2, in which said transistor is of a resonant tunneling bipolar transistor with a resonant tunneling barrier.

8. A multiple-valued current-mode adder as set forth in claim 7, in which said multiple-valued current-mode adder further comprises an output current-to-voltage converter coupled between a first voltage source and said transistor for converting said first output current into a first output voltage.

9. A multiple-valued current-mode adder as set forth in claim 8, in which said input current-to-voltage converter is formed by a first bipolar transistor coupled between said summing node and a second voltage source and having a base node coupled to said summing node and in which said transistor with said negative transconductance is coupled between said output current-to-voltage converter and said second voltage source and having a base node coupled to said summing node.

10. A multiple-valued current-mode adder as set forth in claim 9, in which said output current-to-voltage converter is formed by a load resistor.

11. A multiple-valued current-mode adder as set forth in claim 10, in which said threshold value detecting circuit comprises a second bipolar transistor coupled between a first current source and said second voltage source and having a base node coupled to said summing node, and a third bipolar transistor coupled between a second current source and said second voltage source and having a base node coupled to the first current source.

12. A multiple-valued current-mode adder as set forth in claim 2, in which said transistor comprises an enhancement-mode resonant tunneling field effect transistor with a resonant tunneling barrier, said enhancement-mode resonant tunneling field effect transistor being of a first channel conductivity type.

13. A multiple-valued current-mode adder as set forth in claim 12, in which said multiple-valued current-mode adder further comprises an output current-to-voltage converter coupled between a first voltage source and said transistor for converting said first output current into a first output voltage.

14. A multiple-valued current-mode adder as set forth in claim 13, in which said input current-to-voltage converter is formed by a first enhancement-mode field effect transistor of said first channel conductivity type coupled between said summing node and a second voltage source and having a gate electrode coupled to said summing node and in which said transistor with said negative transconductance is coupled between said output current-to-voltage converter and said second voltage source and having a gate electrode coupled to said summing node.

15. A multiple-valued current-mode adder as set forth in claim 14, in which said output current-to-voltage converter is formed by a second enhancement-mode field effect transistor of said first channel conductivity type having a gate electrode coupled to said first voltage source.

16. A multiple-valued current-mode adder as set forth in claim 15, in which said threshold value detecting circuit comprises a series combination of a third enhancement-mode field effect transistor of said first channel conductivity type, a fourth depletion-mode field effect transistor of the first channel conductivity type and a fifth enhancement-mode field effect transistor of a second channel conductivity type coupled between said second and first voltage sources, and a sixth enhancement-mode field effect transistor of the second channel conductivity type coupled between said second voltage source and a carry node, said third field effect transistor having a gate electrode coupled to said summing node, said fourth field effect transistor having a gate electrode coupled to a drain node thereof for serving as a load transistor, said fifth and sixth field effect transistors having respective gate electrodes coupled to a drain node of said fourth field effect transistor.

17. A multiple-valued current-mode adder as set forth in claim 16, in which said first and second channel conductivity types represent the n-channel type and p-channel type, respectively.

* * * * *